Jan. 23, 1934.    F. E. BELLOWS    1,944,163
ELECTRIC CASTING AND MOLDING MACHINE
Filed May 13, 1932    3 Sheets-Sheet 2
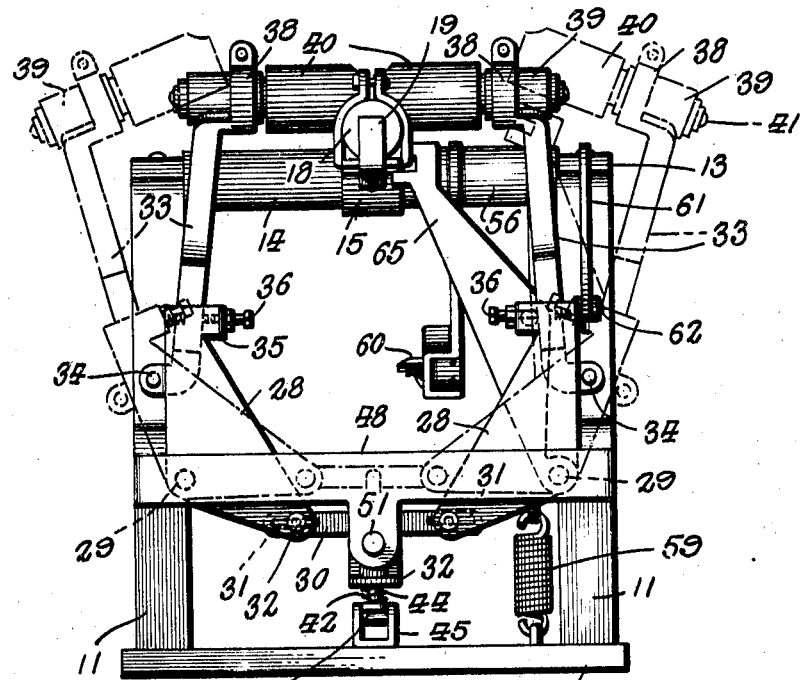

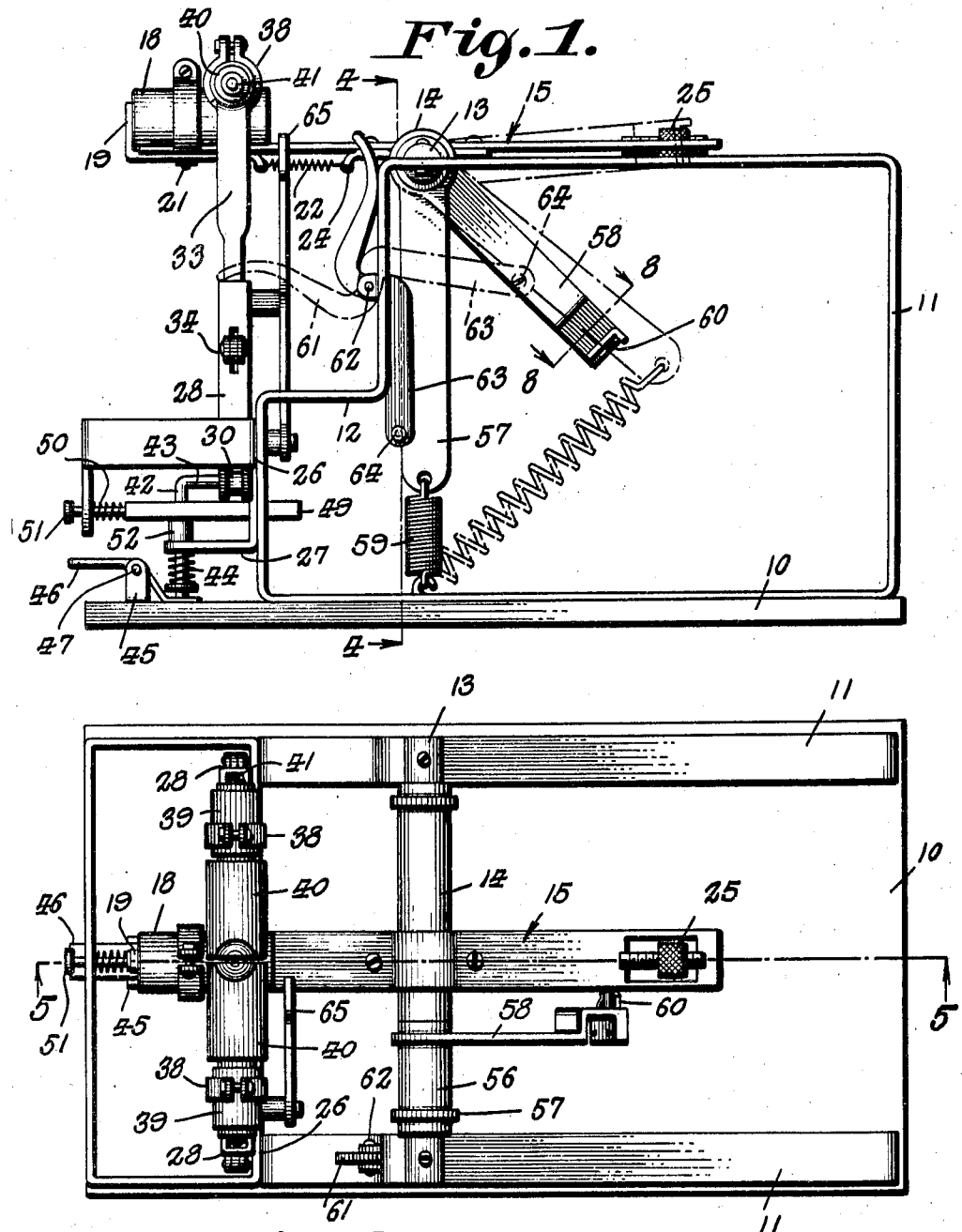

Jan. 23, 1934.  F. E. BELLOWS  1,944,163
ELECTRIC CASTING AND MOLDING MACHINE
Filed May 13, 1932   3 Sheets-Sheet 3
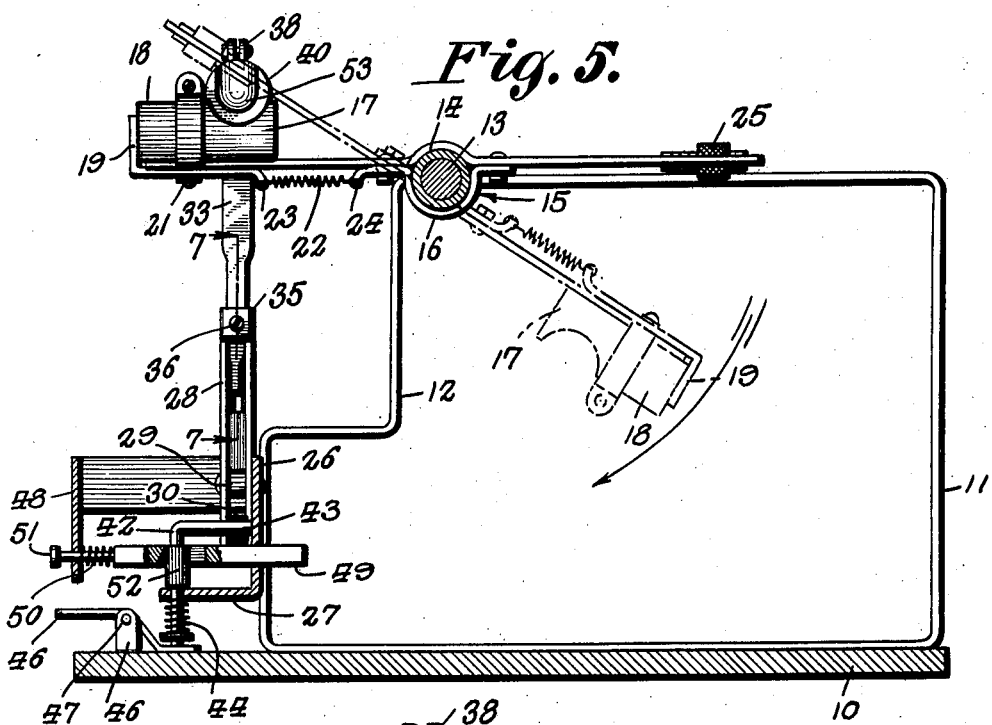
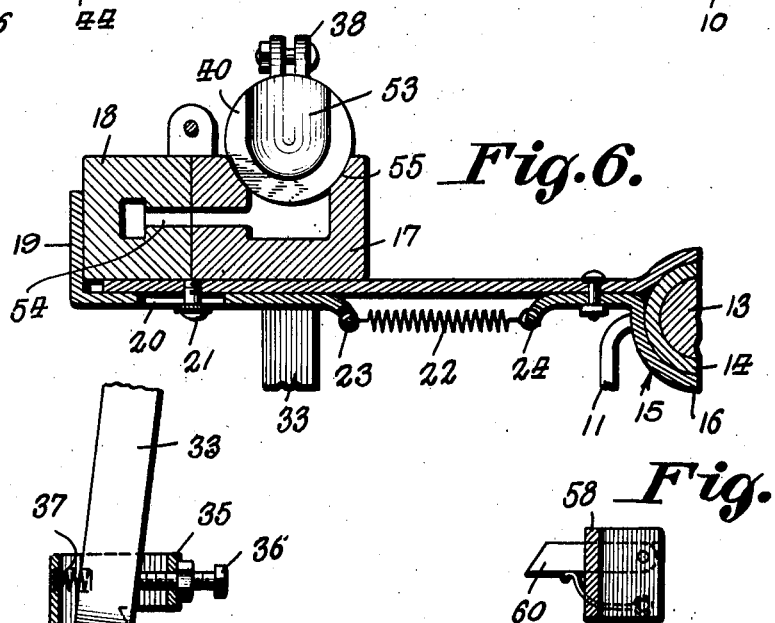
F. E. Bellows, INVENTOR Patented Jan. 23, 1934

1,944,163

UNITED STATES PATENT OFFICE

1,944,163

ELECTRIC CASTING AND MOLDING MACHINE

Foy E. Bellows, Whitewright, Tex., assignor of one-third to R. Lee Bellows, Collin County, Tex., and one-third to Guy Hamilton, Whitewright, Tex.

Application May 13, 1932. Serial No. 611,198

5 Claims. (Cl. 22—65)

The invention relates to a metal casting and molding machine and more especially to an electrically heated casting and molding machine.

The primary object of the invention is the provision of a machine of this character, wherein metal, for example, precious metal, can be electrically heated for the casting and molding thereof, the machine being of a kind for service by jewelers, dentists or other artificers.

Another object of the invention is the provision of a machine of this character, wherein through the use of carbons arranged therein and in association with electric current supply a heating arc can be produced for the melting of metal and the casting and molding of the latter, the mold for the metal being held in a carriage so that when the mold receives the metal in a melted state it can be shifted or moved to position away from the arc or the carbons so that the mold can be conveniently removed after the casting and molding operation, the machine in its entirety being of novel form and is capable of the execution of the casting and molding operations with dispatch.

A further object of the invention is the provision of a machine of this character, wherein the carbons are held in a unique manner so that the flame arc can be increased or decreased and this is accomplished by the adjustment of the relationship of the carbons, while the mold for the work is supported in a novel manner and is readily movable from receiving to delivering position.

A still further object of the invention is the provision of a machine of this character, wherein the work can be performed with dispatch and thus with minimum labor and the saving of time in the completion of the work.

A still further object of the invention is the provision of a machine of this character which is comparatively simple in construction, thoroughly reliable and efficient in its operation, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is a side elevation of the machine constructed in accordance with the invention showing by full lines the normal position of the trip for the mold carriage and by dotted lines the shifting position thereof.

Figure 2 is a top plan view.

Figure 3 is a front elevation showing by full lines the carbons in working position and by dotted lines in inactive or open position.

Figure 4 is a sectional view on the line 4—4 of Figure 1 looking in the direction of the arrows.

Figure 5 is a sectional view on the line 5—5 of Figure 2 looking in the direction of the arrows and also showing therein by an arrow the direction of movement of the carriage.

Figure 6 is a fragmentary enlarged sectional view through the mold carriage.

Figure 7 is a sectional view on an enlarged scale taken on the line 7—7 of Figure 5 looking in the direction of the arrows.

Figure 8 is a sectional view on the line 8—8 of Figure 1 looking in the direction of the arrows.

Similar reference characters indicate corresponding parts throughout the several views in the drawings.

Referring to the drawings in detail, the machine constructed in accordance with the invention comprises a base or bed 10 having arranged thereon spaced parallel upstanding frames 11, these being disposed longitudinally of the base or bed near opposite side edges thereof and are made fast thereto in any desirable manner. These frames at their fronts are provided with inset upper portions 12. Secured to the frames 11 at their tops is a non-rotatable transverse shaft 13, the latter being disposed next to the inset portion 12 in said frames. Journaled upon the shaft 13 is a hub 14 for rotation thereon and it carries a swinging carriage 15 in the form of an arm, the carriage being provided with a clip 16 embracing the hub 14 at a medial point thereof and with respect to the frames 11. Arranged upon the carriage 15 near one end thereof is the detachable section 17 of a mold, its other section 18 removably held related thereto by a spring tensioned clamp 19 mounted on the carriage 15, the clamp being formed with a slot 20 receiving a guide 21 mounted on the carriage 15, the tensioning spring 22 for the clamp 19 being connected with the ears 23 and 24 respectively, one being on the clamp and the other on the clip 16. The other end of the carriage 15 has fitted therein an adjustable weight 25 which under adjustment will enable the balancing of such carriage.

Mounted on the frames 11 below the inset portions 12 is a cross piece 26 formed with a medial depending bracket 27. Pivoted to this piece 26 are laterally swinging holding members 28, the pivots being indicated at 29. Between the members is a connecting bar 30, the slotted ends 31 receiving cross pins 32 mounted in the members 28 and this bar 30 constitutes a connector between the members 28 for simultaneous movement thereof. The members 28 have pivoted therein carbon supports 33, the pivots being indicated at 34 and each support is held within a yoke 35 formed on the companion member 28. The yoke has fitted therein a set screw 36 against which works the supports 33 adjacent thereto and a spring 37 urges the said supports against the set screw. Thus it will be seen that the supports 33 can be adjusted.

The supports at their upper ends are formed with clamps 38 in which are fitted the insulators 39 of carbons 40, these having the terminal connectors 41 for the wires of an electric current supply. The carbons 40 are adapted to be moved to close relation to each other for the creating of an electric flame arc therebetween and said carbons separated a considerable distance from each other for the elimination of the arc.

Mounted for vertical movement in the bracket 27 is a shiftable stem 42 having the right-angular extension 43 loosely engaged with the connecting bar 30, the stem 42 being acted upon by a coiled compression spring 44 which normally holds the stem lowered and in this position the carbons 40 will have swung to close relation to each other. Supported in a bearing 45 is a finger operated trigger 46 pivoted at 47 in said bearing and active upon the stem 42 to raise the same which in turn will spread the carbons 40 apart or separate the same.

The cross piece 26 is formed with a bridge 48 which with the cross piece supports a latch 49 held under tension by a spring 50, the latch at its outer end being provided with a finger button or head 51 and this latch 49 is adapted to automatically engage a shoulder 52 on the stem 42 when the latter is raised so that the supports 33 can be locked in their outwardly swung position and incident thereto the separating of the carbons.

The carbons 40 at their free ends are formed with pockets or wells 53 which open upwardly and through the free ends and into these wells, when the carbons are close to each other, is adapted to be introduced the metal to be melted by the arc flame created by the carbons. The molten metal will be delivered from the pockets or wells 53 into the section 17 of the mold whence the molten metal will flow through a passageway 54 in the sections 17 and 18 of the mold and where it will be molded on the hardening thereof. The section 17 of the mold is channeled at 55 to receive the lower portions of the carbons 40 when brought toward each other so that these and the said section 17 as well as the section 18 will be in working assemblage or relation to each other.

Upon the shaft 13 next to the hub 14 is a connector sleeve 56 having the arm 57 and a latching lever 58, these being disposed at an angle to each other. The arm 57 has connected thereto a tensioning spring 59, the same being also fixed to the base 10. The lever 58 has pivoted therein a spring tensioned tripping dog or pawl 60 which is normally engageable with the carriage 15 near its weighted end. An actuator lever 61 is pivoted at 62 on the frame 11 close to the arm 57 and this lever carries an extension 63 with the tripping lug 64, the latter working against the arm 57. Thus upon pulling downwardly upon the actuator lever 61 when the arm 57 is perpendicular, this being the normal position thereof, it will swing in a direction to have the dog 60 automatically latch with the carriage 15, the latter now being in a substantially horizontal position and thus become held under tension by the spring 59 which has been extended on the movement of the arm 57, and the section 17 in confronting relation to the carbons 40. In this relation the machine will have been set for receiving the metal to be melted, whence on the closing of the circuit the arc flame will be formed and thereby the metal will become molten and flow into the trap 17, thence to the mold 18 for the casting and molding thereof. It will be understood that the carriage 15 when initially moved to horizontal position will have become latched by a jaw 65. When the trigger 46 is depressed and the members 28 swung outwardly with the supports 33 which separates the carbons the said carriage 15 will be released by the jaw 65 and instantly the spring 59 will pull upon the arm 57 thus turning the carriage 15 over from the full line position shown in Figure 5 in the direction of the arrow in said figure of the drawings and in this position the mold will be disposed in discharging or delivering attitude. The mold section 18 can be extracted from the clamp 19 when in delivering attitude.

By adjustment of the supports 33 the extent of the arc flame can be regulated between the carbons 40 when swung to close relation to each other.

When the latching lever 58 has the dog 60 engaged with the carriage 15 at which time the latter will be under tension by the spring 59, the sections 17 and 18 of the mold will be pressed against the carbons 40 which previously have been moved to close relation to each other and the hook 65 will latch the said carriage 15 in this position. Upon release of the latch 65 which is effected by the separation of the carbons 40 the said carriage will swing upwardly and rearwardly at the forward lead end thereof to the position shown in Figure 5 of the drawings.

What is claimed is:—

1. In a machine of the character described, a vertically swinging arm forming a carriage, mold sections removably mounted on one end of the carriage and separable one from the other, oppositely arranged vertically swinging members movable at right angles to the path of movement of said arm, carbon supports adjustably pivoted to said members, carbons on said supports for arrangement in an electric circuit and movable by said supports to intersect one section of the mold and creating an electric flame arc therein, said carbons having matching recesses providing a metal receiving pocket communicative with the mold sections, means for latching the arm when in position for the intersection of the carbons with the mold sections and releasable on the separation of the carbons, and means movable to latching position with the arm and placing the latter under tension whereby on separation of the carbons the arm will be swung to a position for delivering contents from the mold sections.

2. In a machine of the character described, a vertically swinging arm forming a carriage, mold sections removably mounted on one end of the carriage and separable one from the other, oppositely arranged vertically swinging members movable at right angles to the path of movement of said arm, carbon supports adjustably pivoted to said members, carbons on said supports for arrangement in an electric circuit and movable by said supports to intersect one section of the mold and creating an electric flame arc therein, said carbons having matching recesses providing a metal receiving pocket communicative with the mold sections, means for latching the arm when in position for the intersection of the carbons with the mold sections and releasable on the separation of the carbons, means movable to latching position with the arm and placing the latter under tension whereby on separation of the carbons the arm will be swung to a position for delivering contents from the mold sections, and means for moving the supports simultaneously with each other for the separation of the carbons and the release of the arm.

3. In a machine of the character described, a vertically swinging arm forming a carriage, mold sections removably mounted on one end of the carriage and separable one from the other, oppositely arranged vertically swinging members movable at right angles to the path of movement of said arm, carbon supports adjustably pivoted to said members, carbons on said supports for arrangement in an electric circuit and movable by said supports to intersect one section of the mold and creating an electric flame arc therein, said carbons having matching recesses providing a metal receiving pocket communicative with the mold sections, means for latching the arm when in position for the intersection of the carbons with the mold sections and releasable on the separation of the carbons, means movable to latching position with the arm and placing the latter under tension whereby on separation of the carbons the arm will be swung to a position for delivering contents from the mold sections, means for moving the supports simultaneously with each other for the separation of the carbons and the release of the arm, and means on the supports for adjustably and detachably mounting the carbons thereon.

4. In a machine of the character described, a vertically swinging arm forming a carriage, mold sections removably mounted on one end of the carriage and separable one from the other, oppositely arranged vertically swinging members movable at right angles to the path of movement of said arm, carbon supports adjustably pivoted to said members, carbons on said supports for arrangement in an electric circuit and movable by said supports to intersect one section of the mold and creating an electric flame arc therein, said carbons having matching recesses providing a metal receiving pocket communicative with the mold sections, means for latching the arm when in position for the intersection of the carbons with the mold sections and releasable on the separation of the carbons, means movable to latching position with the arm and placing the latter under tension whereby on separation of the carbons the arm will be swung to a position for delivering contents from the mold sections, means for moving the supports simultaneously with each other for the separation of the carbons and the release of the arm, means on the supports for adjustably and detachably mounting the carbons thereon, and means for holding the carbons in intersecting relation to the mold on said arm and also the arm locked.

5. In a machine of the character described, a vertically swinging arm forming a carriage, mold sections removably mounted on one end of the carriage and separable one from the other, oppositely arranged vertically swinging members movable at right angles to the path of movement of said arm, carbon supports adjustably pivoted to said members, carbons on said supports for arrangement in an electric circuit and movable by said supports to intersect one section of the mold and creating an electric flame arc therein, said carbons having matching recesses providing a metal receiving pocket communicative with the mold sections, means for latching the arm when in position for the intersection of the carbons with the mold sections and releasable on the separation of the carbons, means movable to latching position with the arm and placing the latter under tension whereby on separation of the carbons the arm will be swung to a position for delivering contents from the mold sections, means for moving the supports simultaneously with each other for the separation of the carbons and the release of the arm, means on the supports for adjustably and detachably mounting the carbons thereon, means for holding the carbons in intersecting relation to the mold on said arm and also the arm locked, and a manually operable means for shifting the tensioned latching means into engagement with the arm.

FOY E. BELLOWS.